United States Patent
Borghetti et al.

(10) Patent No.: US 10,367,858 B2
(45) Date of Patent: Jul. 30, 2019

(54) CONTEMPORANEOUS FEEDBACK DURING WEB-CONFERENCES

(71) Applicant: International Business Machines Corporation, Armonk, NY (US)

(72) Inventors: Stefano Borghetti, Viterbo (IT); Gianluca Della Corte, Rome (IT); Leonida Gianfagna, Rome (IT); Luigi Massa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/425,695

(22) Filed: Feb. 6, 2017

(65) Prior Publication Data
US 2018/0227343 A1   Aug. 9, 2018

(51) Int. Cl.
| | |
|---|---|
| *H04L 12/00* | (2006.01) |
| *G06F 13/00* | (2006.01) |
| *H04L 29/06* | (2006.01) |
| *H04L 29/08* | (2006.01) |
| *G06F 17/27* | (2006.01) |

(Continued)

(52) U.S. Cl.
CPC ...... *H04L 65/4015* (2013.01); *G06F 17/2785* (2013.01); *G06N 20/00* (2019.01); *H04L 65/403* (2013.01); *H04L 67/02* (2013.01); *H04L 41/5003* (2013.01); *H04L 67/22* (2013.01); *H04L 67/34* (2013.01)

(58) Field of Classification Search
CPC ..... H04L 65/4015; H04L 67/02; H04L 67/22; H04L 12/4641

USPC .................................................. 709/204, 224
See application file for complete search history.

(56) References Cited

U.S. PATENT DOCUMENTS

| | | | |
|---|---|---|---|
| 6,223,188 B1 * | 4/2001 | Albers | G06F 3/167 715/205 |
| 7,747,953 B2 | 6/2010 | Saavedra | |
| 7,870,494 B2 | 1/2011 | Lentz | |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Frantz Coby
(74) *Attorney, Agent, or Firm* — Heslin Rothenberg Farley & Mesiti P.C.; Brian Restauro, Esq.

(57) ABSTRACT

A method, computer program product, and system includes a processor(s) initiating a web conferencing session between a host and a client, by the client receiving a presentation and transmitting the presentation to a semantic engine, wherein the semantic engine performs an automatic machine learning session to generate a presentation concepts list comprising concepts relevant to the presentation, and progressively displaying the presentation in a thin client application on the client. The processor(s) monitors on the client, during the web conferencing session, activities executed on the client and extracts web concepts related to the activities executed on the client. The processor(s) determines an interest level of a user of the client in the presentation, based on determining a presence or absence of a relationship of each web concept to one or more of the concepts relevant to the presentation and displays the interest level in a graphical user interface.

20 Claims, 5 Drawing Sheets

(51) Int. Cl.
  *G06N 20/00* (2019.01)
  *H04L 12/24* (2006.01)

(56) References Cited

U.S. PATENT DOCUMENTS

| | | | | |
|---|---|---|---|---|
| 8,010,603 | B2* | 8/2011 | Arnett | G06F 17/30056 |
| | | | | 709/204 |
| 8,392,503 | B2 | 3/2013 | Kuhlke et al. | |
| 8,539,359 | B2* | 9/2013 | Rapaport | G06Q 10/10 |
| | | | | 715/751 |
| 8,996,519 | B2 | 3/2015 | D'Orazio Pedro de Matos | |
| 10,091,323 | B2* | 10/2018 | Schleier-Smith | H04L 67/306 |
| 10,116,801 | B1* | 10/2018 | Christiano | H04M 3/563 |
| 2009/0220064 | A1* | 9/2009 | Gorti | H04M 3/56 |
| | | | | 379/202.01 |
| 2015/0154291 | A1* | 6/2015 | Shepherd | H04L 65/403 |
| | | | | 707/748 |
| 2015/0200785 | A1 | 7/2015 | Gupta et al. | |
| 2016/0011729 | A1 | 1/2016 | Flores et al. | |
| 2016/0042648 | A1* | 2/2016 | Kothuri | G06F 3/015 |
| | | | | 434/236 |
| 2016/0073054 | A1* | 3/2016 | Balasaygun | H04N 7/15 |
| | | | | 348/14.08 |
| 2016/0073059 | A1* | 3/2016 | Bader-Natal | H04N 7/15 |
| | | | | 348/14.03 |
| 2016/0261655 | A1* | 9/2016 | Aggarwal | H04L 65/4053 |
| 2017/0262419 | A1* | 9/2017 | Dunne | G06F 17/241 |
| 2018/0007150 | A1* | 1/2018 | Deopura | H04L 67/22 |

OTHER PUBLICATIONS

River-Pelayo et al., "Live Interest Meter—Learning from Quantified Feedback in Mass Lectures", LAK '13 Proceedings of the Third International Conference on Learning Analytics and Knowledge, pp. 23-27.

* cited by examiner

| Participant | Engagement Level |
|---|---|
| Joe Smith | 3 |
| Ellen Jones | 3 |
| Pat Kane | 3 |
| Josie Portman | 2 |
| Josh Light | 1 |

CONTEMPORANEOUS FEEDBACK DURING WEB-CONFERENCES

BACKGROUND

Presentations given over web conference platforms benefit from feedback, which will indicate the efficacy of the presentation. Real-time feedback is valuable in order to adjust the presentation "on-the-fly" to communicate with the audience successfully.

SUMMARY

Shortcomings of the prior art are overcome and additional advantages are provided through the provision of a method for determining user engagement in a presentation. The method includes, for instance: initiating, by the one or more processors, a web conferencing session between a host and a client, wherein the web conferencing session comprises: receiving a presentation and transmitting the presentation to a semantic engine, wherein the semantic engine performs an automatic machine learning session to generate a presentation concepts list comprising concepts relevant to the presentation; and progressively displaying the presentation in a thin client application on the client, wherein progression of the presentation is controlled by the host; monitoring, by the one or more processors, on the client, during the web conferencing session, activities executed on the client; extracting, by the one or more processors, web concepts related to the activities executed on the client; determining, by the one or more processors, an interest level of a user of the client in the presentation, based on determining a presence or absence of a relationship of each web concept to one or more of the concepts relevant to the presentation on the presentation concepts list; and displaying, by the one or more processors, the interest level of a user in a graphical user interface on the host.

Shortcomings of the prior art are overcome and additional advantages are provided through the provision of a computer program product for determining user engagement in a presentation. The computer program product comprises a storage medium readable by a processing circuit and storing instructions for execution by the processing circuit for performing a method. The method includes, for instance: initiating, by the one or more processors, a web conferencing session between a host and a client, wherein the web conferencing session comprises: receiving a presentation and transmitting the presentation to a semantic engine, wherein the semantic engine performs an automatic machine learning session to generate a presentation concepts list comprising concepts relevant to the presentation; and progressively displaying the presentation in a thin client application on the client, wherein progression of the presentation is controlled by the host; monitoring, by the one or more processors, on the client, during the web conferencing session, activities executed on the client; extracting, by the one or more processors, web concepts related to the activities executed on the client; determining, by the one or more processors, an interest level of a user of the client in the presentation, based on determining a presence or absence of a relationship of each web concept to one or more of the concepts relevant to the presentation on the presentation concepts list; and displaying, by the one or more processors, the interest level of a user in a graphical user interface on the host.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
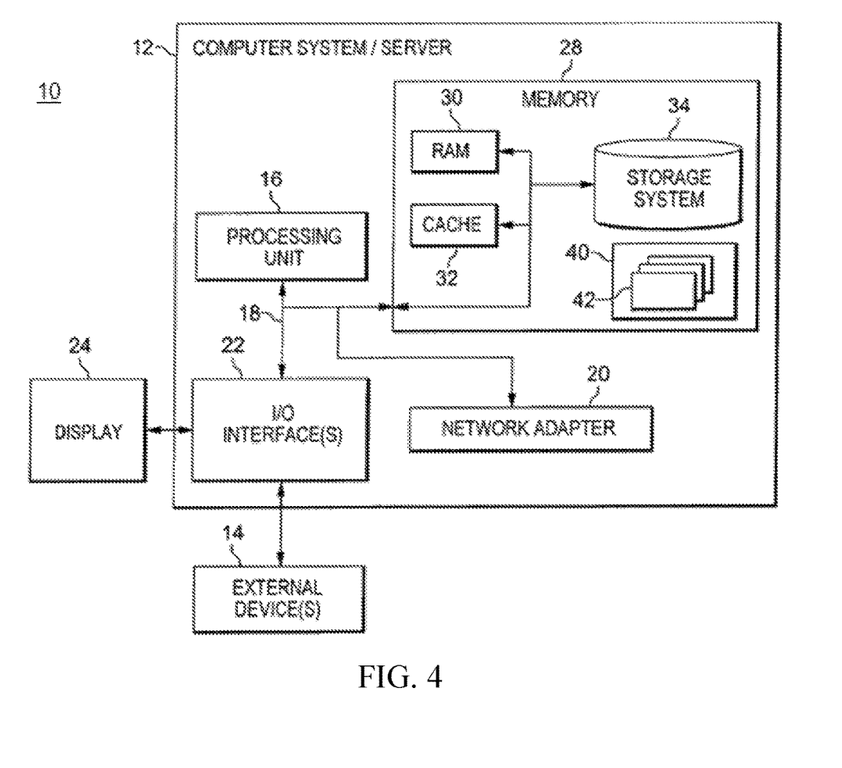
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include computer system, a computer-implemented method, and a computer program product that include one or more programs that receive and interpret feedback during web conference presentations from the individuals who are attending the web conference, virtually. Receiving comprehensible feedback contemporaneously with presenting can assist a presenter in dynamically adapting the presentation to the audience's needs/skills (i.e., tailoring the presentation "on the fly"). Additionally, by receiving comprehensive feedback, a presenter can gain an understanding of the audience and what is effective when presenting to this audience, which allows the presenter to improve the presentation for upcoming sessions. In contrast to existing systems that poll participants during a presentation to in order to have this feedback, one or more programs executed by at least one processor in embodiments of the present invention do not require active participation of the users through polling, but, rather, passively collect instructive feedback from attendees of web conferences, by combining a machine-learned understanding of the presentation itself and the monitoring and interpretation of behaviors of participants, that are contemporaneous with the presentation. Based on this analysis, embodiments of the present invention can estimate participant interest in the presentation and indicate which areas of a presentation might be improved.

Embodiments of the present invention provide a computer-implemented method of automatically collecting real-time quantitative feedback from users connected to a web conference in virtual attendance at a presentation. To this end, embodiments of the present invention include one or more programs that may be referred to as an analytics agent (e.g., Activity Scanner Agent 110, FIG. 1), which intercept what each participant is doing on the device (e.g., computing device 120, FIG. 1) he or she uses to attend the presentation (e.g., presentation 140, FIG. 1).

Certain embodiments of the present invention offer advantages over existing web conferencing feedback systems by providing a presenter with data that indicates if members of an audience are engaged with the presentation or are instead doing unrelated things on their computing devices. One or more programs in embodiments of the present invention can determine whether an alternate activity (to listening alone) conducted by an audience member during a web conference-based presentation is related or unrelated to the presentation. For example, while some existing systems might interpret all web browsing activity by a participant as being unrelated to the presentation and indicative of an issue with engaging this user, one or more programs in embodiments of the presentation can discern whether the web browsing activity is related or not related to the presentation. For example, a user may be so interested in the presentation that he or she is utilizing another web browser tab to find background information to enhance her or his understanding of the presentation. Thus, while existing systems would report a user conducting web searches as inattentive, embodiments of the present invention can more accurately determine whether the user is inattentive or, alternatively, engaged and reading relevant additional content.

Embodiments of the present invention offer advantages over existing presentation feedback systems and methods and these advantages are inextricably tied to computing. Among the advantages or embodiments of the present invention are that utilizing one or more programs in embodiments of the present invention to monitor user behavior and generate useful feedback from this behavior reduces errors caused by traditional The Hypertext Transfer Protocol (HTTP) listeners, which are limited to recording actions of users with no context. It is the understanding of the context of the actions of users during a presentation that enhance the functionality of the web conference system as a whole and provide an advantage to web conferencing (a service inextricably tied to computing). Based on the contextualized feedback enabled by program code in embodiments of the present invention, presenters, which include both automated presentation programs and individuals managing web presentations, can implement changes to presentations that correctly tune the presentation to the audience.

In embodiments of the present invention, one or more programs also provide, contemporaneous with the presentation, data indicating the engagement of individual participants and/or the audience as a whole, in a format that is easily comprehended by the presenter. As part of the feedback provided by the one or more programs monitoring user activity during a presentation, in some embodiments of the present invention, one or more programs generate information topics/concepts researched by listeners contemporaneously to portions of the presentations. In an embodiments of the present invention, the one or more program can supplement the presentation with this additional information in subsequent presentations.

For ease of understanding, program code executed in embodiments of the present invention may be discussed as being embodied in separate modules or agents. However, as understood by one of skill in the art, the distribution of the functionality described can be accomplished in various ways in embodiments of the present invention. Thus, the modular descriptions are presented merely for illustrative purposes and do not represent any limitations to implementations of embodiments of the present invention.

Figure 1:
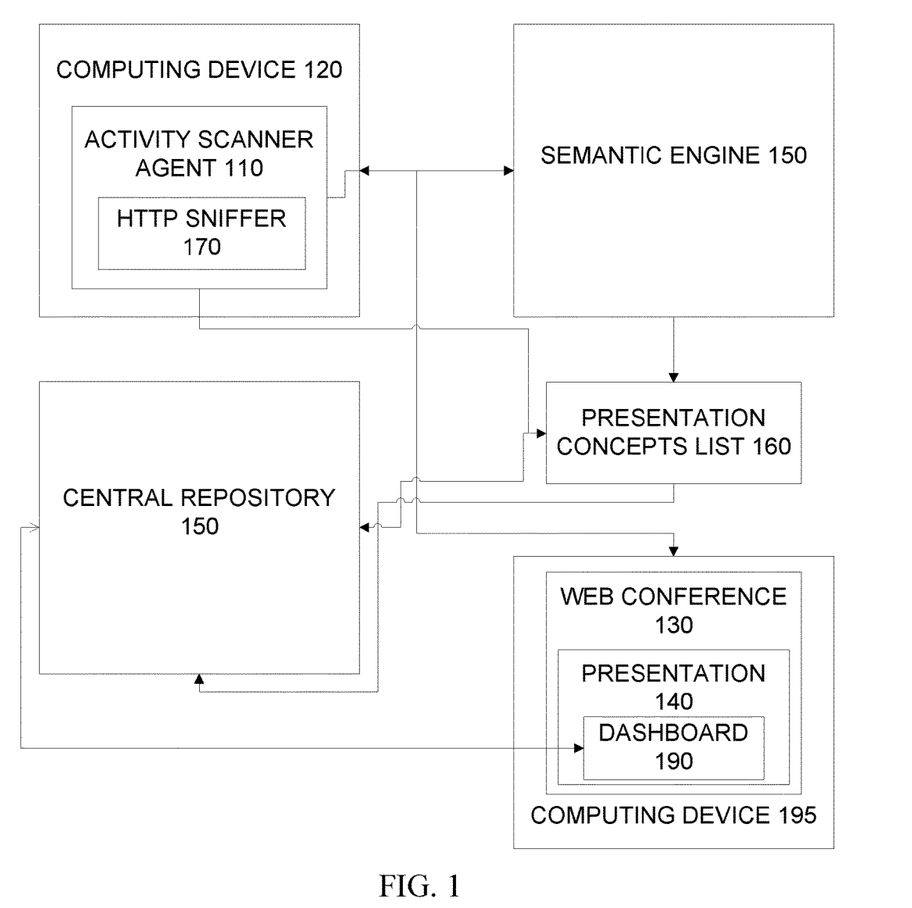
FIG. 1 is a computing environment illustrating certain aspects of embodiments of the present invention.

In some embodiments of the present invention, to provide a computer-implemented method of automatically collecting real-time quantitative feedback from users attending a presentation by connecting to a web conference, program code in embodiments of the present invention analyzes users' behavior on their computers, as they observe the presentation. Based on the observations, one or more programs in embodiments of the present invention map behaviors to the semantics of the conference content. FIG. 1 illustrates an implementation of certain of the programs of embodiments of the present invention. As aforementioned, the separation of the functionality into modules is provided for illustrative purposes and is meant to represent one possibility of many for the location of program code related to various aspects of embodiments of the present invention.

Referring to FIG. 1, in some embodiments of the present invention, the program code executed on at least on processing circuit includes an Activity Scanner Agent 110. One or more programs install the Activity Scanner Agent 110 on each computing device 120 that is utilized to participate in a web conference 130 in which a presentation 140 is viewed. In FIG. 1, the web conference 130 in which the presentation 140 is presented is hosted on a computing device 195. Only a single participant's computing device 120 is depicted in FIG. 1 to simplify this illustrations, but it represents all computing devices utilized to connect to the web conference 130. The one or more programs may install the Activity Scanner Agent 110 upon connection of the computing device 120 to the web conference 130 and/or upon commencement of the presentation 140. In an embodiment of the present invention, the Activity Scanner Agent 110 is an extension of the plugins that are used to deliver web presentations, which the user of the computing device 120 may be required to accept to participate in the web conference 130. Based on receiving an acceptance, one or more programs of the Activity Scanning Agent 110 will run locally on the computing device 120 at presentation 140 time, and/or upon connection to the web conference 130, in general. Alternatively, one or more programs in an embodiment of the present invention may provide and/or install the Activity Scanner Agent 110 at some time in advance of the computing device 120 connecting to the web conference 130.

The Activity Scanner Agent 110 scans the presentation 140 and transmits it to a Semantic Engine 150. The Semantic Engine 150 may be installed locally as part of the Activity Scanner Agent 110, or may be centrally located and accessible to all computing devices 120 connecting to the web conference 130 to view the presentation 140. The Semantic Engine 150 may also execute on the same computing device or devices from which the web conference 130 and presentation 140 are hosted.

In an embodiment of the present invention, one or more programs in the Semantic Engine 150 conduct an unsupervised machine learning session or learning period. By executing machine learning algorithms, the one or more programs in the Semantic Engine 150 go through the presentation to understand the context and content of the presentation and to build a mind map of the main contents on the Internet, that are related to presentation itself. To build this map, one or more programs extract key words from the presentation, search them utilizing third party search tools accessible via a private or public networking connection (e.g., Google, Bing). Based on the key words and search results, the one or more programs in the Semantic Engine 150 build the mind map of the key words and related links in a top-priority list, referred to as a Presentation Concepts List 160. In an embodiment of the present invention, the Presentation Concepts List 160 is an XML, file.

In embodiments of the present invention, one or more programs in the Activity Scanner Agent 110 analyze the participant activity on the computing device 120, which the participant is using to attend the presentation 140, offered via web conference 130. While participating in the web conference 130 and viewing the presentation 140, which is rendered on the computing device 120, for example, in a web browser or other thin client graphical user interface (GUI), the user may navigate to other locations on the Internet, for example, utilizing tabs on the same web browser (or on a different web browser) than the presentation 140 appears in on the computing device 120. In general, users switch attention in this manner during a web conference 130 for two reasons: 1) the presentation 140 is interesting, so the user accesses and/or searches for related links; or 2) the presentation 140 is not interesting, so the user has decided to do something unrelated during the presentation 140, which the user accomplishes by navigating to another website (other than the one that is serving the presentation 140) contemporaneously with virtually attending the presentation 140.

Because of the user's expected navigational behavior, during the presentation 140, program code embodied in the Activity Scanner Agent 110 monitors the activity of a user on the computing device 120. In an embodiment of the presentation, one or more programs in the Activity Scanner Agent 110 monitor user activity by extracting web concepts from the pages searched or visited by the user during the conference. One or more programs in the Activity Scanner Agent 110 access the Presentation Concepts List 160 to determine if these web concepts are included therein.

In some embodiments of the present invention the Activity Scanner Agent 110 utilizes and/or includes an HTTP sniffer 170 to capture the user's navigation flow during this real time analysis of where the user is navigating in relation to presentation's content. The one or more programs analyze the web concepts in view of the Presentation Concepts List 160 and rank the web concepts by importance. For example, in some embodiments of the present invention, one or more programs in the Activity Scanner Agent 110 assign rankings of HIGH, MEDIUM, LOW, or NULL, to each web concept. In an embodiment of the present invention, the one or more programs generate an XML file containing the results and rankings. In an embodiment of the present invention, the one or more programs update the XML file that is the Presentation Concepts List 160 with the results and rankings. The original and/or updated results file is stored in the Centralized Repository 180, in some embodiments of the present invention. As illustrated in FIG. 1, the Centralized Repository 180 is accessible both to the computing device 195 hosting the presentation and the computing device 120 that a user is utilizing to connect to the web conference 130.

In an embodiment of the present invention, one or more programs of the Activity Scanner Agent 110 utilize the NULL state to catalogue all the occurrences of participants running another application that is not the current browser, i.e., the browser on the computing device 120 that a user is utilizing to connect to the web conference 130. In an embodiment of the present invention, the one or more programs include event-driven code that records the loss of focus of the user, based on the user shifting from the browser to another undetermined application.

Figure 2:
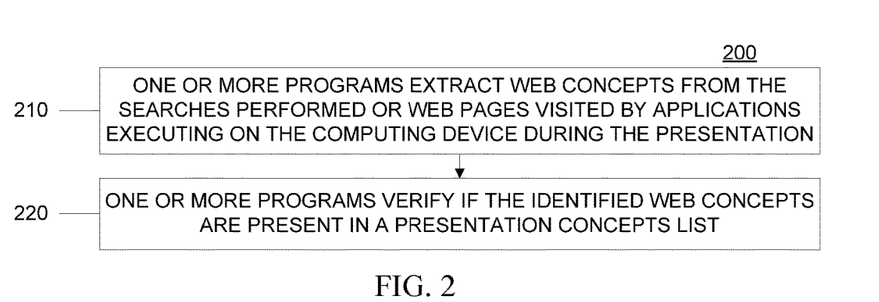
FIG. 2 is a workflow illustrating certain aspects of an embodiment of the present invention.

FIG. 2 is a workflow 200 that demonstrates certain aspects of the one or more programs of the Activity Scanner Agent 110 (FIG. 1) in some embodiments of the present invention. In an embodiment of the present invention, when one or more programs in the Activity Scanner Agent 110 (FIG. 1) monitor the activity of a user on a computing device 120 (FIG. 1), the one or more programs extract web concepts from the searches performed or web pages visited by applications executing on the computing device 120 (FIG. 1) during the presentation 140 (FIG. 1) (210). Extracting web concepts includes, the one or more programs intercepting visited web pages, parsing intercepted web pages to extract web concepts, and creating a list of web concepts. The one or more programs then verify if the identified web concepts are present in the Presentation Concepts List 160 (FIG. 1) (220). In an embodiment of the present invention, as part of the verification, if the one or more programs determine that a concept is present in the Presentation Concepts List 160 (FIG. 1), the one or more programs add the concept to a results file (e.g., an XML file) with a rank of HIGH. In an embodiment of the present invention, as part of the verification, if the one or more programs determine that a concept is not present, but a more general concept relevant to this concept is present in the Presentation Concepts List 160 (FIG. 1), the one or more programs add the web concept into the file with a rank of MEDIUM. In an embodiment of the present invention, as part of the verification, if the one or more programs cannot determine that a concept is not present but cannot determine whether the concept is relevant, the one or more programs add the web concept into the file with a rank of LOW. In an embodiment of the present invention, as part of the verification, if the one or more programs determine that the concept is not present and not relevant to the presentation, the one or more programs add the web concept to the file with a designation of NULL. In some embodiments of the present invention, the one or more programs may prompt the presenter to make a determination of whether the concept is relevant, and based on the answer, re-designate the web concept in the file. For example, the one or more programs may message the presenter during the presentation or after the presentation with a question regarding the concept.

In embodiments of the present invention, the one or more programs utilize machine learning algorithms to determine the relevance of web concepts to a presentation. As discussed in FIG. 2, an output of embodiments of the present invention is a file (e.g., XML) that represents a list of Internet content related to the presentation, with each link (and/or concept) ranked with a strength (i.e., degree of matching with the presentation). In an embodiment of the invention, based on input received from the presenter, one or more programs annotate certain concepts with specific tagging for concepts that the presenter identifies as important to presentation's success.

Returning to FIG. 1, in an embodiment of the present invention, one or more programs in a Centralized Repository 180 receive rankings from each Activity Scanner Agent 110, consolidate the ranking for all users, and based on the rankings, evaluate the quality of the presentation. In an embodiment of the present invention, one or more programs in the Centralized Repository 180 can implement changes to the presentation 140 based upon the indications of the consolidated data. In an embodiment of the present invention, one or more programs of the Centralized Repository 180, e.g., in real time, aggregate and report the results to the presenter in a Dashboard 190 for a real time feedback, for viewing, in advance of an off-line deep dive analysis. The Dashboard 190 interface is accessible to the presenter through a graphical user interface (GUI) on the computing device 195 that he or she used to initiate the web conference 130.

Embodiments of the present invention assist a presenter in understanding audience response to a presentation, which can aid the presenter in tuning the presentation, including in real-time, to efficiently communicate the information contained therein. For example, an objective of a given presentation is to facilitate the selling of a specific product. As illustrated in FIG. 1, at presentation time, one or more programs in the Activity Scanner Agent 110 run on a participant's computing device 120 and, in some embodiments, leverage an HTTP sniffer 170 to intercept all the pages visited by the participant during the presentation 140. The one or more programs analyze this real time information and compare it with a file (e.g., XML) that includes the Presentation Concepts List 160, in order to retrieve a synthetic indicator of the interest of the participant for the presentation. The one or more programs update the file with synthetic indicators (e.g., HIGH, MEDIUM, LOW, and NULL) and present the indicators in real time in a Dashboard 190, to the presenter, who can decide whether to tailor the presentation based on this real time feedback. In another embodiment of the present invention, the one or more programs can suggest and/or implement automatic changes to the presentation based on the feedback. The one or more programs may provide the feedback from the entire audience, aggregated, as well as providing the feedback on a user by user basis, such that the presenter can understand the results on a granular level.

Figure 3:
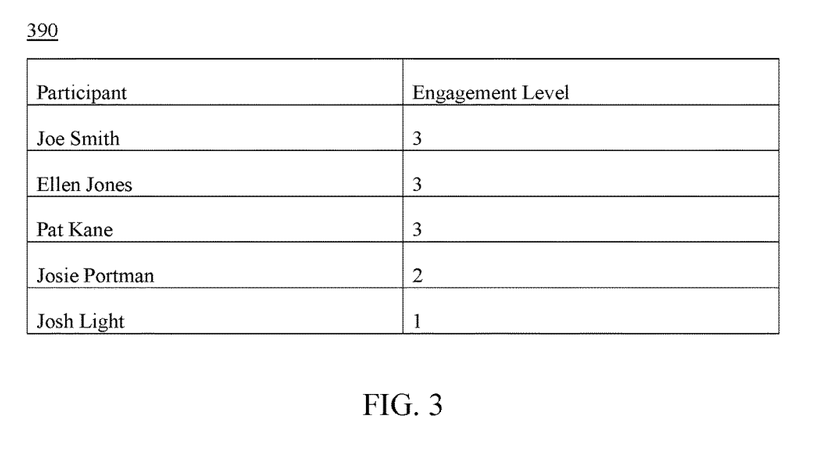
FIG. 3 is an illustration of certain aspects of an embodiment of the present invention.

FIG. 3 is an example of a web conferencing interface that can be utilized in an embodiment of the present invention and a Dashboard 190 (FIG. 1) displaying real time feedback in accordance with certain embodiments of the present invention. In this example, on the Dashboard 390, a presenter views the five (5), in this example, participants in a web conference. This granular view indicates individuals with a "3" rating are engaged, individuals with a "2" rating are neutral, and individuals with a "1" rating are not engaged, with the presentation. Thus, in this example, participants Joe Smith, Ellen Jones, and Pat Kane are engaged. Josie Portman is neutral and Josh Light is not engaged.

In embodiments of the present invention, presenters can study the real time analysis after a presentation is complete, based on the data provided by the Activity Scanner Agent 110 (FIG. 1). One or more programs in embodiments of the present invention can populate in the Dashboard 390 various data, including but not limited to, ranking of the links accessed by the participants, the relationships between the specific parts of the presentation and the searched keywords, and/or times in which the participant navigated the Internet during the presentation most frequently.

In some embodiments of the present invention, after the presentation, the one or more programs pass the results (e.g., an XML, file) to the Semantic Engine 150, for example, from the Centralized Repository 180, where one or more programs perform a post learning machine supervised session in order to enrich the understanding of the relationships between the participants' activities and the presentation content. During this session, the one or more programs execute machine learning algorithms to perform one or more of the following actions: 1) catalogue the web concepts and/or destinations (e.g., visited links) that the one or more programs in the Semantic Engine 150 were unable to determine as relevant or irrelevant to the presentation 140; and/or 2) based on feedback provided by the presenter, change the strengths for some of the concepts or links to indicate a greater or lesser importance. Based on this learning session, the one or more programs can update the Presentation Concepts List 160, which the one or more programs of the Activity Scanner Agent 110 can utilize in later presentations or the presentation 140, thus providing an arguably improved level of feedback to the next presenter.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing device 120 and/or the computing device 195 (FIG. 1), can be understood as cloud computing node 10 (FIG. 4) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
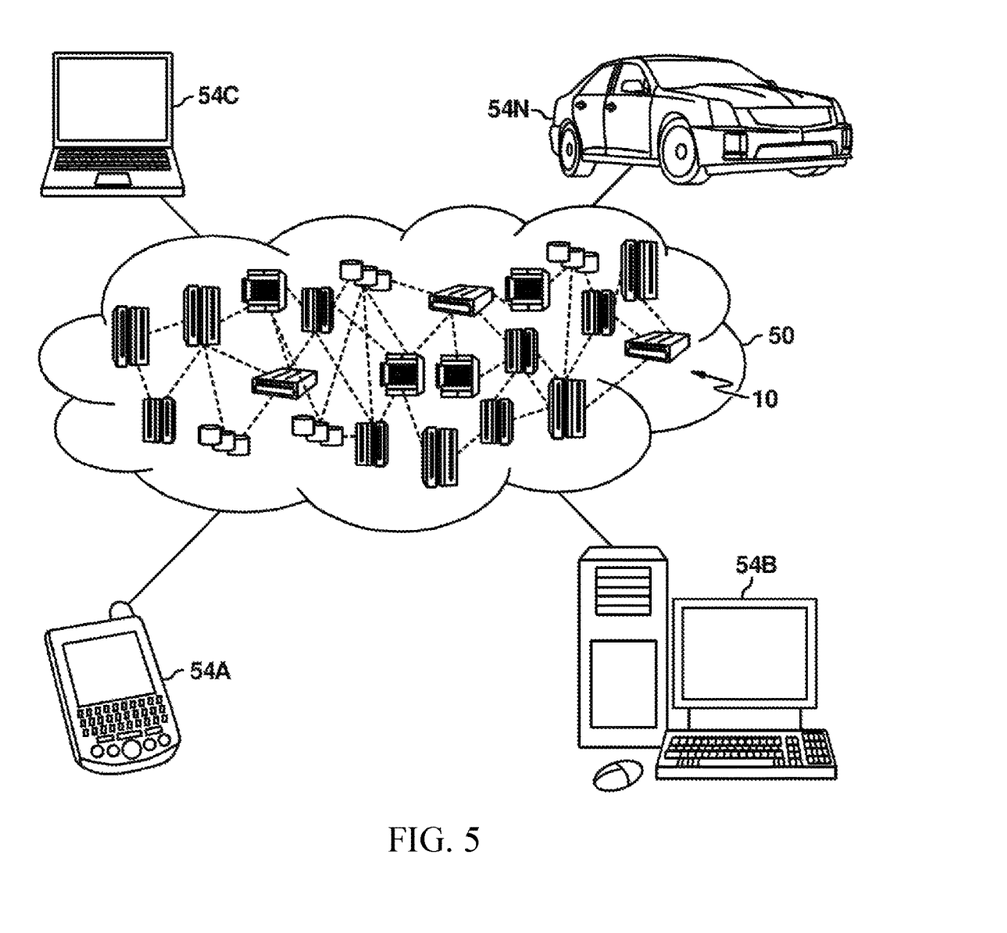
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
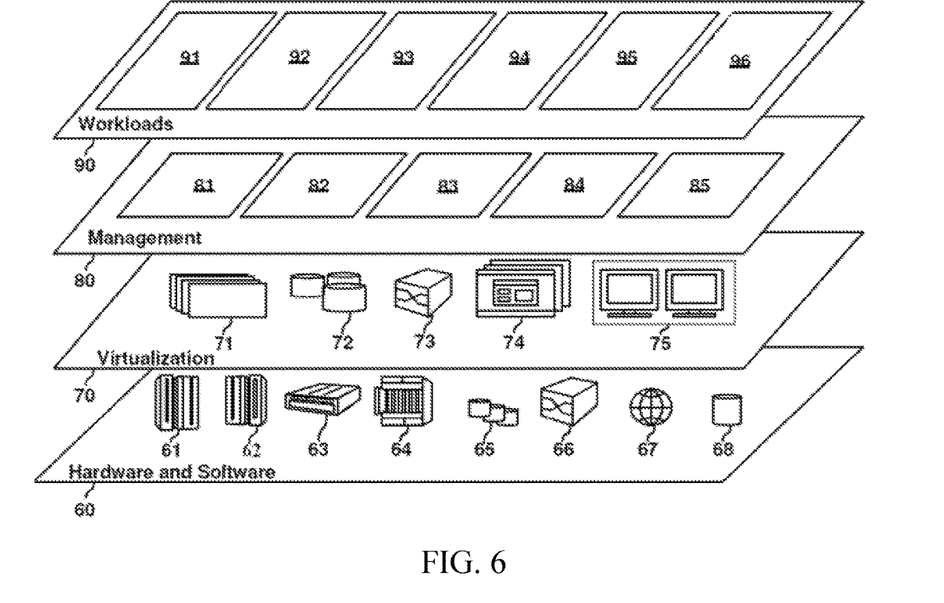
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluating real time feedback during a presentation at a web conference 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    initiating, by one or more processors, a web conferencing session between a host and a client, wherein the web conferencing session comprises:
        receiving a presentation and transmitting the presentation to a semantic engine, wherein the semantic engine performs an automatic machine learning session to generate a presentation concepts list comprising concepts relevant to the presentation; and progressively displaying the presentation in a thin client application on the client, wherein progression of the presentation is controlled by the host;

monitoring, by the one or more processors, on the client, during the web conferencing session, activities executed on the client;

extracting, by the one or more processors, web concepts related to the activities executed on the client;

determining, by the one or more processors, an interest level of a user of the client in the presentation, based on determining a presence or absence of a relationship of each web concept to one or more of the concepts relevant to the presentation on the presentation concepts list; and displaying, by the one or more processors, the interest level of a user in a graphical user interface on the host.

2. The computer-implemented method of claim 1, wherein the monitoring, extracting, determining, and displaying are performed sequentially at regular intervals during the web conferencing session.

3. The computer-implemented method of claim 1, wherein the extracting comprises:

intercepting, by the one or more processors, visited web pages;

parsing, by the one or more processors, content of the intercepted web pages; and generating, by the one or more processors, the list of web concepts based on the content.

4. The computer-implemented method of claim 1, wherein the initiating the web conferencing session further comprises:

installing, by the one or more processors, an activity analysis agent on the client; and wherein the monitoring further comprises:

utilizing, by the one or more processors, the activity analysis agent to perform the monitoring.

5. The computer-implemented method of claim 1, wherein the determining the interest level of the user comprises, for each web concept:

based on determining the presence or the absence of the relationship of a web concept to the one or more of the concepts relevant to the presentation, quantifying the presence or the absence of the relationship by assigning a value to the web concept, wherein the value is selected from a finite group of values, wherein the values each represent levels of relevance of the web concept to the one or more of the concepts relevant to the presentation;

updating, by the one or more processors, a results file with the web concept and the value.

6. The computer-implemented method of claim 5, wherein the displaying comprises:

accessing, by the one or more processors, the results file; and displaying, by the one or more processors, a portion of the results file.

7. The computer-implemented method of claim 6, wherein at least one or the results file or the presentation concepts list is an XML file.

8. The computer-implemented method of claim 6, wherein the results file and the presentation concepts list comprise a single file.

9. The computer-implemented method of claim 1, wherein the monitoring on the client comprises utilizing an HTTP sniffer to capture a navigation flow of a web browser executing on the client.

10. The computer-implemented method of claim 9, wherein the web conferencing session was initiated on a first tab of the web browser and the monitoring occurs on a second tab on the web browser.

11. The computer-implemented method of claim 1, further comprising:

determining, by the one or more processors, for at least one web concept that no a presence or absence of a relationship can be determined;

soliciting, by the one or more processors, via the host, feedback regarding the at least one web concept from the host; and receiving by the one or more processors, feedback regarding the at least one web concept; and based on the feedback, updating, by the one or more processors, data in the results file related to the at least one web concept.

12. A computer program product comprising:

a computer readable storage medium readable by one or more processors and storing instructions for execution by the one or more processors for performing a method comprising:

initiating, by the one or more processors, a web conferencing session between a host and a client, wherein the web conferencing session comprises:

receiving a presentation and transmitting the presentation to a semantic engine, wherein the semantic engine performs an automatic machine learning session to generate a presentation concepts list comprising concepts relevant to the presentation; and progressively displaying the presentation in a thin client application on the client, wherein progression of the presentation is controlled by the host;

monitoring, by the one or more processors, on the client, during the web conferencing session, activities executed on the client;

extracting, by the one or more processors, web concepts related to the activities executed on the client;

determining, by the one or more processors, an interest level of a user of the client in the presentation, based on determining a presence or absence of a relationship of each web concept to one or more of the concepts relevant to the presentation on the presentation concepts list; and displaying, by the one or more processors, the interest level of a user in a graphical user interface on the host.

13. The computer program product of claim 12, wherein the monitoring, extracting, determining, and displaying are performed sequentially at regular intervals during the web conferencing session.

14. The computer program product of claim 12, wherein the extracting comprises:

intercepting, by the one or more processors, visited web pages;

parsing, by the one or more processors, content of the intercepted web pages; and generating, by the one or more processors, the list of web concepts based on the content.

15. The computer program product of claim 12, wherein the initiating the web conferencing session further comprises:

installing, by the one or more processors, an activity analysis agent on the client; and wherein the monitoring further comprises:
utilizing, by the one or more processors, the activity analysis agent to perform the monitoring.

16. The computer program product of claim 12, wherein the determining the interest level of the user comprises, for each web concept:
based on determining the presence or the absence of the relationship of a web concept to the one or more of the concepts relevant to the presentation, quantifying the presence or the absence of the relationship by assigning a value to the web concept, wherein the value is selected from a finite group of values, wherein the values each represent levels of relevance of the web concept to the one or more of the concepts relevant to the presentation;
updating, by the one or more processors, a results file with the web concept and the value.

17. The computer program product of claim 16, wherein the displaying comprises:
accessing, by the one or more processors, the results file; and
displaying, by the one or more processors, a portion of the results file.

18. The computer program product of claim 17, wherein at least one or the results file or the presentation concepts list is an XML file.

19. The computer program product of claim 17, wherein the results file and the presentation concepts list comprise a single file.

20. A system comprising:
a memory;
one or more processors in communication with the memory; and
program instructions executable by the one or more processors via the memory to perform a method, the method comprising:
initiating, by the one or more processors, a web conferencing session between a host and a client, wherein the web conferencing session comprises:
receiving a presentation and transmitting the presentation to a semantic engine, wherein the semantic engine performs an automatic machine learning session to generate a presentation concepts list comprising concepts relevant to the presentation; and
progressively displaying the presentation in a thin client application on the client, wherein progression of the presentation is controlled by the host;
monitoring, by the one or more processors, on the client, during the web conferencing session, activities executed on the client;
extracting, by the one or more processors, web concepts related to the activities executed on the client;
determining, by the one or more processors, an interest level of a user of the client in the presentation, based on determining a presence or absence of a relationship of each web concept to one or more of the concepts relevant to the presentation on the presentation concepts list; and
displaying, by the one or more processors, the interest level of a user in a graphical user interface on the host.

* * * * *